United States Patent
Espinasse et al.

(10) Patent No.: US 10,190,722 B2
(45) Date of Patent: Jan. 29, 2019

(54) UNBONDED FLEXIBLE PIPE FOR TRANSPORTING AN ABRASIVE MATERIAL, ASSOCIATED METHOD AND ASSOCIATED USE

(71) Applicant: TECHNIP FRANCE, Courbevoie (FR)

(72) Inventors: Philippe Espinasse, Bihorel (FR); Thomas Parenteau, Paris (FR)

(73) Assignee: TECHNIP FRANCE (FR)

( * ) Notice: Subject to any disclaimer, the term of this patent is extended or adjusted under 35 U.S.C. 154(b) by 176 days.

(21) Appl. No.: 15/308,735

(22) PCT Filed: May 6, 2015

(86) PCT No.: PCT/EP2015/059961
§ 371 (c)(1),
(2) Date: Nov. 3, 2016

(87) PCT Pub. No.: WO2015/169859
PCT Pub. Date: Nov. 12, 2015

(65) Prior Publication Data
US 2017/0184246 A1    Jun. 29, 2017

(30) Foreign Application Priority Data
May 6, 2014   (FR) ..................................... 14 54094

(51) Int. Cl.
*F16L 11/12* (2006.01)
*F16L 57/06* (2006.01)
(Continued)

(52) U.S. Cl.
CPC .............. *F16L 57/06* (2013.01); *B29C 53/52* (2013.01); *B29C 53/54* (2013.01); *B29D 23/001* (2013.01);
(Continued)

(58) Field of Classification Search
CPC .......... F16L 11/16; F16L 11/08; F16L 11/081; F16L 11/083
(Continued)

(56) References Cited

U.S. PATENT DOCUMENTS

| 3,888,714 A | 6/1975 | Fiser et al. |
| 5,634,497 A | 6/1997 | Neto |

(Continued)

FOREIGN PATENT DOCUMENTS

| DE | 18 10 369 A1 | 6/1970 |
| EP | 0 429 426 A1 | 5/1991 |
| WO | WO 2009/013434 | 1/2009 |

OTHER PUBLICATIONS

International Search Report dated Jul. 23, 2015 issued in corresponding International patent application No. PCT/EP2015/059961.
(Continued)

*Primary Examiner* — Patrick F Brinson
(74) *Attorney, Agent, or Firm* — Ostrolenk Faber LLP

(57) ABSTRACT

The pipe includes at least one tubular sheath delimiting a passage for circulation of the abrasive material, at least one tensile armor layer externally positioned with respect to the tubular sheath, the armor layer including a plurality of filiform armor elements. It further includes a protective internal layer positioned inside the tubular sheath in the circulation passage, the protective internal layer including an elastomeric matrix and a longitudinal reinforcement assembly embedded in the matrix.

19 Claims, 4 Drawing Sheets

(51) Int. Cl.
   *E02F 3/88* (2006.01)
   *E02F 7/10* (2006.01)
   *E21C 50/00* (2006.01)
   *F16L 11/08* (2006.01)
   *B29D 23/00* (2006.01)
   *B32B 27/08* (2006.01)
   *B32B 27/20* (2006.01)
   *B32B 1/08* (2006.01)
   *B29C 53/52* (2006.01)
   *B29C 53/54* (2006.01)
   *B29C 65/48* (2006.01)
   *B29C 65/50* (2006.01)
   *B29C 65/56* (2006.01)
   *B29C 65/00* (2006.01)

(52) U.S. Cl.
   CPC ............... *B32B 1/08* (2013.01); *B32B 27/08* (2013.01); *B32B 27/20* (2013.01); *E02F 3/8858* (2013.01); *E02F 7/10* (2013.01); *E21C 50/00* (2013.01); *F16L 11/083* (2013.01); *B29C 65/48* (2013.01); *B29C 65/5014* (2013.01); *B29C 65/5042* (2013.01); *B29C 65/562* (2013.01); *B29C 66/1142* (2013.01); *B29C 66/1282* (2013.01); *B29C 66/12841* (2013.01); *B29C 66/14* (2013.01); *B29C 66/4322* (2013.01); *B29C 66/71* (2013.01); *B29C 66/7212* (2013.01); *B29C 66/72141* (2013.01); *B32B 2264/105* (2013.01); *B32B 2307/54* (2013.01); *B32B 2307/554* (2013.01); *B32B 2307/584* (2013.01); *B32B 2597/00* (2013.01)

(58) Field of Classification Search
   USPC .............................. 138/134, 135, 172, 174
   See application file for complete search history.

(56) References Cited

U.S. PATENT DOCUMENTS

| | | | | |
|---|---|---|---|---|
| 6,679,298 B2* | 1/2004 | Espinasse | ............... | F16L 11/08 138/119 |
| 6,769,454 B2* | 8/2004 | Fraser | ................. | B29D 23/001 138/104 |
| 6,843,278 B2* | 1/2005 | Espinasse | ............... | F16L 11/16 138/127 |
| 6,926,039 B2* | 8/2005 | Marion | ................. | F16L 11/081 138/114 |
| 9,046,201 B1* | 6/2015 | Theis | ...................... | F16L 11/08 |
| 2001/0025664 A1* | 10/2001 | Quigley | ................... | D04C 1/06 138/125 |
| 2007/0062595 A1* | 3/2007 | Bhatnagar | ................. | B32B 1/08 138/125 |
| 2011/0203695 A1 | 8/2011 | Gudme | | |

OTHER PUBLICATIONS

Written Opinino dated Jul. 23, 2015 issued in corresponding International patent application No. PCT/EP2015/059961.

* cited by examiner

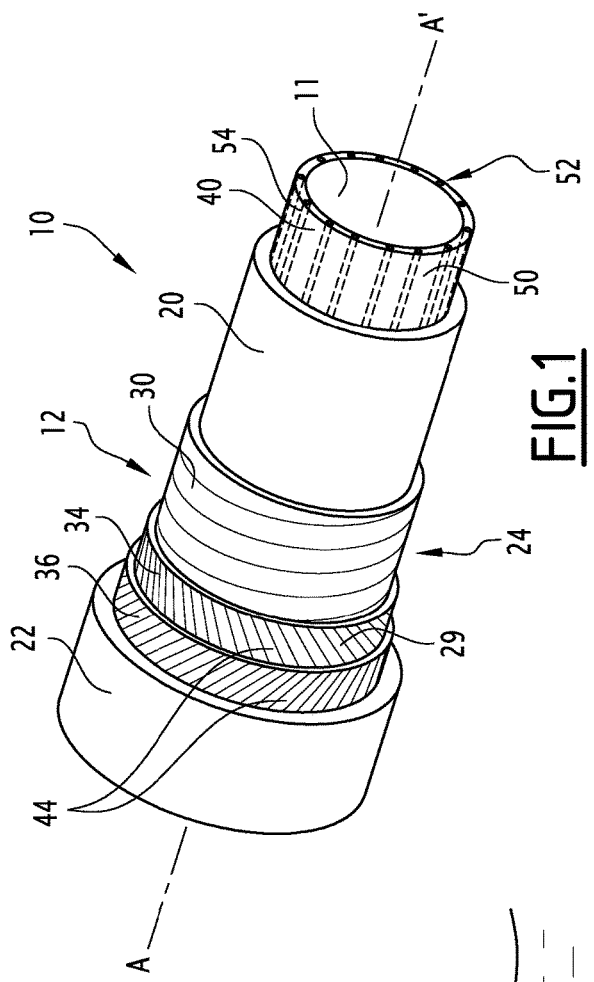
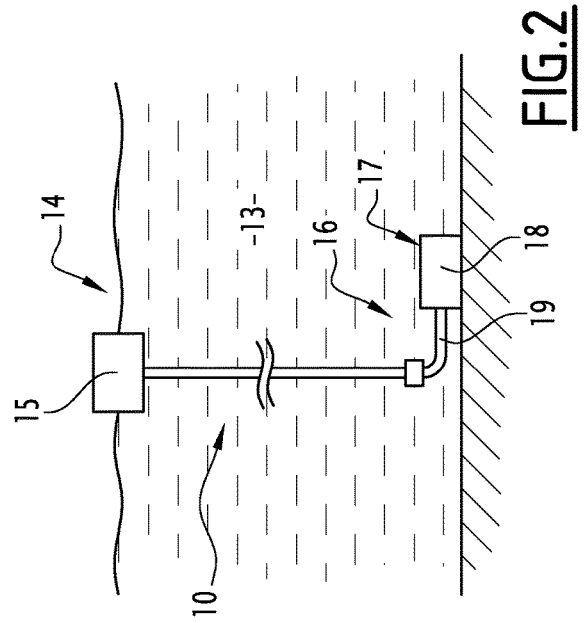

UNBONDED FLEXIBLE PIPE FOR TRANSPORTING AN ABRASIVE MATERIAL, ASSOCIATED METHOD AND ASSOCIATED USE

CROSS REFERENCE TO RELATED APPLICATIONS

The present application is a 35 U.S.C. § 371 National Phase conversion of PCT/EP2015/059961, filed May 6, 2015, which claims benefit of French Application No. 14 54094, filed May 6, 2014, the disclosure of which is incorporated herein by reference. The PCT International Application was published in the French language.

TECHNICAL FIELD OF THE INVENTION

The present invention relates to a unbonded flexible pipe for transporting an abrasive material including:
- at least one tubular sheath delimiting a passage for circulation of the abrasive material;
- at least one tensile armor layer arranged externally with respect to the tubular sheath, the armor layer comprising a plurality of filiform armor elements.

The pipe is in particular intended for transporting, across an extent of water, an abrasive material collected on the bottom of the extent of water. The extent of water is for example an ocean, a sea, a lake or a river.

Alternatively, the pipe is used for mining activities at the surface, and not across an extent of water.

BACKGROUND OF THE INVENTION

Such a flexible pipe is for example made according to the normative documents API 17J (Specification for Unbonded Flexible Pipe) and API RP 17B (Recommended Practice for Flexible Pipe) established by the American Petroleum Institute.

The pipe is generally formed with a set of concentric and superposed layers. It is considered as unbounded in the sense of the present invention from the moment that at least one of the layers of the pipe is able to move longitudinally with respect to the adjacent layers during flexure of the pipe. In particular, an unbonded pipe is a pipe without any binding materials connecting layers forming the pipe.

In a known way, such a pipe includes a tubular internal structure comprising at least one pressure sheath. The pipe includes layers of tensile armor positioned around the tubular internal structure.

The pipe further includes, in certain cases, a pressure volt, formed with at least one stapled wire for example having a T-profile or a Z-profile. A fret may also be spirally wound around the pressure volt.

The abrasive material is collected at the bottom of the extent of water for example within the scope of a mining operation of an underwater bottom, or further during excavation work of underwater soils with view to setting into place facilities for producing hydrocarbons. The abrasive material for example comprises rocks and/or sediments.

In particular, the abrasive material is formed with mining aggregates disaggregated by underwater excavatory cutting machines. These aggregates are notably obtained from massive sulfide deposits (designated by the term of Seabed Massive Sulfides or SMS) containing traces of metals, notably of copper, of lead, of zinc, of gold, of silver or of other metals.

In certain cases, these materials are located at significant depths, sometimes greater than several hundred meters. Within this scope, WO 2009/013434 describes a device for extracting materials comprising a pipe of the aforementioned type giving the possibility of bringing back the material from the extraction facility located at the bottom of the extent of water towards the surface.

The recovered material at the bottom of the extent of water is sometimes highly abrasive and generates significant wear of the transport pipe, notably by cutting wear mechanisms or by gouging wear mechanisms.

In order to ensure the conveyance of the abrasive material towards the surface, it is therefore necessary to have a flexible pipe which has good mechanical strength, notably in traction and in pressure, and which also has excellent resistance to abrasion, considering the size and the aspect of the mining aggregates to be brought to the surface, for a period of time which may attain several years, or even several tens of years.

SUMMARY OF THE INVENTION

An object of the invention is therefore to have a flexible fluid transport pipe, able to convey an abrasive material from significant depths, by guaranteeing sufficient flow rate and a significant service life, for example of several years.

For this purpose, the object of the invention is a pipe of the aforementioned type, characterized in that it further comprises an internal protection layer positioned inside the tubular sheath in the circulation passage, the internal protective layer including an elastomeric matrix and a longitudinal reinforcement assembly embedded in the matrix.

The pipe according to the invention may comprise one or several of the following features, taken individually or according to any technically possible combination:
- the longitudinal reinforcement assembly includes a plurality of filiform metal elements embedded in the matrix.
- the longitudinal reinforcement assembly includes a network of non-metal reinforcement fibers embedded in the matrix, advantageously a technical fabric.
- the matrix is formed on the basis of an elastomer selected from among a rubber, notably natural rubber, or an artificial rubber of the styrene-butadiene rubber type, butadiene rubber type, nitrile-butadiene rubber type, chloroprene rubber type, butyl rubber type, ethylene-propylene-diene monomer rubber type, a polyurethane thermoplastic, or an elastomeric thermoplastic.
- the internal protective layer includes at least one sheet of a continuous material folded on itself along the side edges of the sheet, the side edges being advantageously placed end-to-end, and an assembly for assembling the side edges of the sheet, advantageously by adhesive bonding, stapling, snap-fastening, crimping, and/or wrapping.
- the internal protective layer is formed with a continuous profile advantageously obtained by extrusion.
- the thickness of the internal protective layer is greater than 10 mm, and is notably comprised between 15 mm and 30 mm.
- the internal diameter of the internal protective layer is greater than 10 cm, and is notably comprised between 15 cm and 35 cm.
- the tubular sheath is attached on the internal protective layer.
- its length is greater than 10 m.

The object of the invention is also a method for manufacturing an unbonded flexible pipe for transporting an abrasive material comprising the following steps:
manufacturing at least one tubular sheath;
positioning at least one tensile armor layer externally with respect to the tubular sheath, the armor layer comprising a plurality of filiform armor elements,
characterized by the following step:
positioning an internal protective layer inside the tubular sheath in the circulation passage, the internal protective layer including an elastomeric matrix and a longitudinal reinforcement assembly embedded in the matrix.

The method according to the invention may comprise one or several of the following features, taken individually or according to any technically possible combination:
the positioning of the internal protective layer in the tubular sheath is carried out during the manufacturing of the tubular sheath, advantageously by extrusion of the tubular sheath above the internal protective layer.
it includes a preliminary step for manufacturing the internal protective layer, the preliminary manufacturing step comprising the following phases:
providing a sheet including an elastomeric matrix and a longitudinal reinforcement assembly embedded in the matrix;
winding the sheet around a winding axis in order to form a tubular internal protective layer.
the preliminary manufacturing step includes, after winding the sheet, the attachment of the side edges of the sheet along a generatrix, advantageously by adhesive bonding, stapling, snap-fastening, crimping, and/or wrapping.

The object of the invention is also the use of a pipe as defined above for conveying an abrasive material between a bottom assembly including a material sampling and/or collecting device on the bottom of an extent of water and a surface assembly located at the surface of the extent of water.

BRIEF DESCRIPTION OF THE DRAWINGS

The invention will be better understood upon reading the description which follows, only given as an example, and made with reference to the appended drawings, wherein:
FIG. 1 is a partly cutout perspective view of a flexible pipe according to the invention;
FIG. 2 is a schematic partial sectional view of an operating facility for a mining material on the bottom of an extent of water, comprising a flexible pipe according to the invention.

DESCRIPTION OF PREFERRED EMBODIMENTS

In all the following, the terms of "outer" or "externally" and "inner" or "internally" are generally understood radially with respect to an axis A-A' of the pipe, the term of "outer" being meant as relatively further away radially from the axis A-A' and the term of "inner" being understood as relatively closer radially to the axis A-A' of the pipe.

Figure 3:
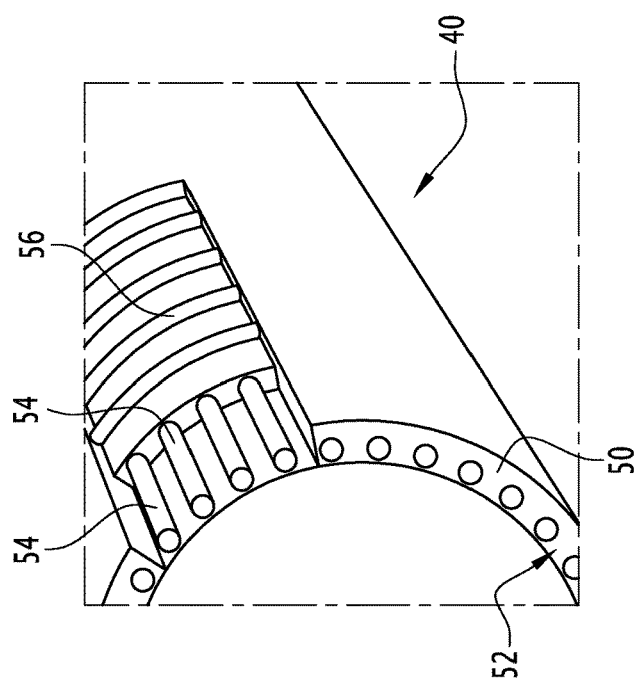
FIG. 3 is a partly cutout perspective view of the internal protective layer of the pipe of FIG. 1.

A first flexible pipe 10 according to the invention is partly illustrated by FIGS. 1 to 3.

The flexible pipe 10 includes a central segment 12 partly illustrated in FIG. 1. It includes, at each of the axial ends of the central segment 12, an endpiece (not shown).

With reference to FIG. 1, the pipe 10 delimits a central passage 11 for circulation of an abrasive material.

The central passage 11 extends along an axis A-A', between the upstream end and the downstream end of the pipe 10. It opens across the endpieces.

The diameter of the central passage 11 is advantageously comprised between 50 mm and 500 mm.

The abrasive material for example comprises rocks and/or sediments dispersed in water or in another fluid medium with high viscosity and density, such as mud.

In particular, the abrasive material is formed by mining aggregates, desegregated by underwater excavatory cutting machines. These aggregates for example stem from the collection of nodules deposited on the seabed or are obtained from bulk sulphide deposits (designated by the term of "Seabed Massive Sulfide" or SMS) containing metal trace amounts, notably of copper, of lead, of zinc, of gold, of silver, or of other metals.

The flexible pipe 10 is intended to be positioned across an extent of water 13 in an operating facility 14 for the material, visible in FIG. 2.

The extent of water 13 is for example a sea, a lake or an ocean. The depth of the extent of water 13 at right angles to the operating installation 14 is for example comprised between 500 m and 5,000 m.

Preferably, the central segment 12 of the pipe extends continuously over a length greater than 50 m, notably greater than 100 m, and for example comprised between 250 m and 3,000 m.

The operating installation 14 includes a surface assembly 15, generally floating, and a bottom assembly 16, which are preferably connected together through the flexible pipe 10.

The bottom assembly 16 includes a device 17 for sampling material on the bottom of the extent of water 13, for example an excavatory vehicle 18 movable on the bottom of the extent of water 13 or movable sampling clamps.

The sampling device 17 is connected to the pipe 10 for example through a flexible link 19 of the "jumper" type.

The flexible pipe 10 is an "unbonded" pipe (designated by the term of unbonded D).

At least two adjacent layers of the flexible pipe 10 are free to move longitudinally, relatively to each other during flexure of the pipe.

Advantageously, all the layers of the flexible pipe are free to move relatively to each other, except for a protective internal layer which is attached on the first sheath, as this will be seen below. Such a pipe is for example described in the normative documents published by the American Petroleum Institute (API), API 17J, and API RP17B.

As illustrated by FIG. 1, the pipe 10 delimits a plurality of concentric layers around the axis A-A', which continuously extend along the central segment 12 as far as the endpieces located on the ends of the pipe.

According to the invention, the pipe 10 includes at least one first sheath 20 based on a polymeric material forming a pressure sheath.

The pipe 10 comprises a second external sheath 22, intended for protecting the pipe 10. The second sheath 22 delimits with the first sheath 20 a ring-shaped space 24.

In this ring-shaped space 24, the pipe 10 advantageously includes a pressure volt 30 and a plurality of tensile armour layers 34, 36 externally positioned with respect to the pressure volt 30.

According to the invention, the flexible pipe 10 comprises an internal protective layer 40, positioned in the first sheath 20 for protecting the first sheath 20 from the material circulating in the central passage 11.

In a known way, the internal sheath 20 is intended to sealably confine the fluid conveying the passage 16. It is formed in a polymeric material, for example based on a polyolefin such as polyethylene, on the base of a polyamide such as PA11 or PA12, or on the basis of a fluorinated polymer such as polyvinylidene fluoride (PVDF).

The thickness of the internal sheath 20 is for example comprised between 5 mm and 20 mm.

In this example, the pressure volt 30 is intended to reabsorb the forces related to the pressure prevailing inside the internal sheath 20. For example it is formed with a metal profile wire surrounded as a helix around the sheath 20. The profiled wire preferably has a geometry, notably Z-shaped, T-shaped, U-shaped, K-shaped, X-shaped or I-shaped.

The pressure volt 30 is wound as a helix with a short pitch around the internal sheath 20, i.e. with a helix angle of an absolute value close to 90°, typically comprised between 75° and 90°.

In the example illustrated in FIG. 1, the flexible pipe 10 includes at least one pair of armour layers 34, 36.

Each pair includes a first armour layer 34 applied on the volt 30, and a second armour layer 36, positioned around the first armour layer 34.

Each armour layer 34, 36 includes at least one longitudinal armour element 44 wound with a long pitch around the axis A-A' of the pipe 10.

By "wound with a long pitch", is meant that the absolute value of the helix angle is less than 55°, and is typically comprised between 15° and 55°.

In the example illustrated in FIG. 1, the absolute value of the helix angle of each armour layer 34, 36 is notably comprised between 30° and 55°

The armour elements 44 of a first layer 34 are generally wound according to an opposite angle with respect to the armour elements 44 of a second layer 36. Thus, if the winding angle of the armour elements 44 of the first layer 34 is equal to +α, α being comprised between 15° and 55°, the winding angle of the armour elements 44 of the second layer 36 positioned in contact with the first layer 34 is for example −α, with α comprised between 15° and 55°.

The armour elements 44 are for example formed with metal wires or in a composite material, or with ribbons having a high mechanical strength.

Each armour layer 34, 36 advantageously rests on at least one anti-wear strip. The anti-wear strip is for example made in plastic, notably on the basis of a polyamide or a polyvinylidene fluoride (PVDF). It has a thickness of less than the thickness of each sheath 20, 22.

The external sheath 22 is intended to protect the ring-shaped space 24 by preventing penetration of fluid from the outside of the flexible pipe 10 towards the inside. It is advantageously made in a polymeric material, notably based on a polyolefin, such as polyethylene, on the basis of a polyamide, such as PA11 or PA12.

The thickness of the external sheath 22 is for example comprised between 5 mm and 15 mm.

The protective internal layer 40 is positioned in the tubular sheath 20. It is advantageously attached in the tubular sheath 20, during the manufacturing of the tubular sheath 20. It has a tubular shape with an A-A' axis.

The internal protective layer 40 covers the totality of the internal surface of the tubular sheath 20 directed towards the A-A' axis in the central segment 12 of the pipe 10. It is not necessary that the protective internal layer 40 ensures a sealing function.

According to the invention, and with reference to FIG. 3, the protective internal layer includes a matrix 50 in an elastomeric material and a longitudinal reinforcement assembly 52, embedded in the matrix 50.

The matrix in elastomer 50 is formed with a material selected from among a rubber, notably natural rubber, an artificial rubber of the SBR type (styrene butadiene rubber), of the BR type (butadiene rubber), of the NBR type (nitrile-butadiene rubber), CR type (chloroprene rubber type), IIR type (butyl rubber), EPDM type (ethylene-propylene-diene monomeric rubber), a polyurethane thermoplastic, or an elastomeric thermoplastic.

These elastic properties ensure better resistance to wear mechanisms, by means of the deformation which the matrix 50 may undergo in contact with the abrasive material and also give the possibility of avoiding crack propagation.

The thickness of the matrix 50 and therefore of the protective internal layer 40 is preferably greater than 10 mm, and is notably comprised between 15 mm and 30 mm.

The internal diameter of the matrix 50 and therefore of the protective internal layer 40 is greater than 10 cm, and is notably comprised between 15 cm and 35 cm.

In the example illustrated by FIG. 3, the longitudinal reinforcement assembly 52 includes a plurality of filiform metal elements 54 embedded in the matrix.

Each filiform element 54 is preferably formed with a continuous homogeneous wire, for example made in steel, notably of the steel cord type (or in high resistance synthetic fiber of the aramide, ultra high molecular weight polyethylene (or "UHMWPE") or carbon type.

The diameter of each element 54 is less than the thickness of the matrix 50. This diameter is for example comprised between 0.15 mm and 1 mm.

At least one portion of the filiform elements 54 extend axially along the axis A-A', parallel to the axis A-A', or tilted with respect to the axis A-A'.

The filiform elements 54 are here positioned parallel to each other, circumferentially away from each other.

In an alternative, the longitudinal reinforcement assembly 52 further includes circumferential elements 56, partly visible in FIG. 3, surrounding the filiform elements 54 around the axis A-A', without being bound to the filiform elements 54.

Figure 4:
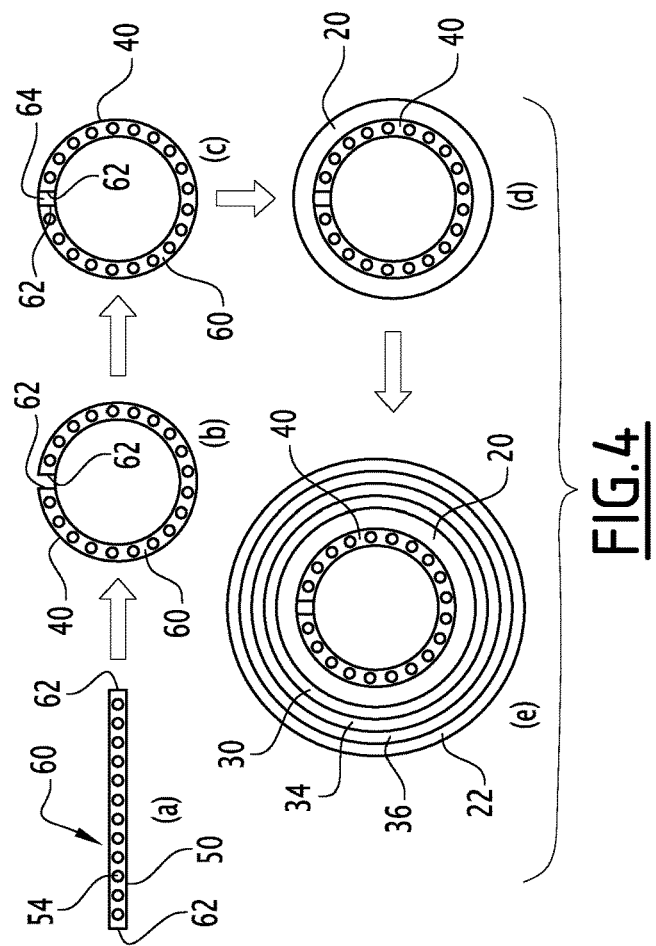
FIG. 4 is a schematic view of the various steps of a first method for manufacturing a flexible pipe according to the invention.

In an embodiment illustrated in FIG. 4, the protective internal layer 54 is formed on the basis of a sheet 60 of a material folded on itself along the side edges 62 of the sheet 60 in order to place the edges 62 end-to-end, and with an assembly 64 for assembling the side edges 62 of the sheet 60.

The sheet 60 has a width substantially equal to the circumference of the protective internal layer 40, and a length substantially equal to the length of the internal protective layer 40, advantageously comprised between 50 m and 3,000 m.

Figure 6:
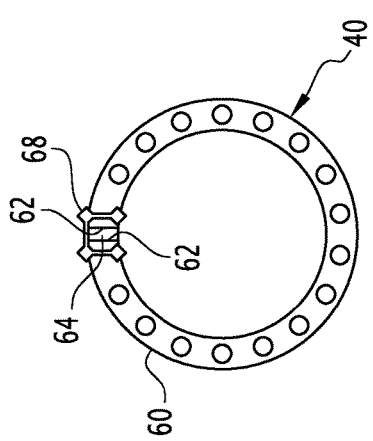
FIGS. 6 to 10 illustrate diverse assembling alternatives for the wound strip forming the internal protective layer of the pipe of FIG. 1.
Figure 7:
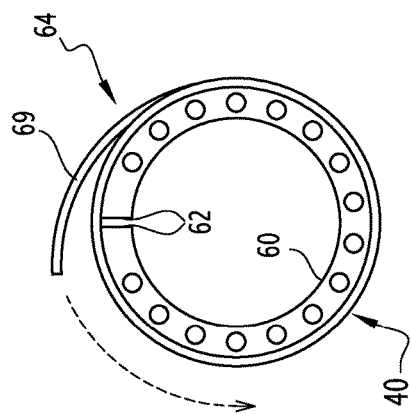
Figure 9:
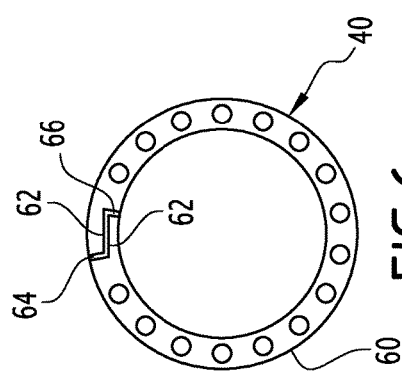
Figure 8:
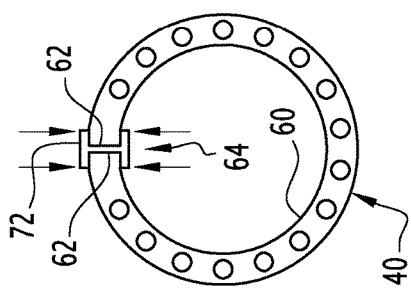
Figure 10:
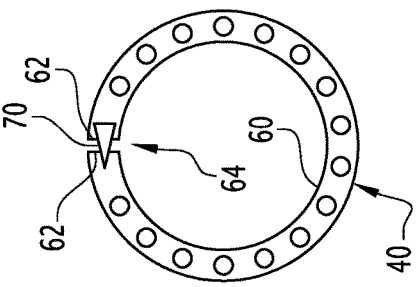

It has a thickness substantially equal to that of the protective internal layer 40, notably comprised between 20 mm and 30 mm The assembly for assembling 64 for example includes adhesive 66 (FIG. 6), staples 68 (FIG. 7), an adhesive tape 69 which may be reinforced with metal or synthetic threads (FIG. 10), a snap-fastening mechanism 70 (FIG. 8), a crimping member 72 (FIG. 9).

The assembling assembly 64 extends along a generatrix of the protective internal layer 40, advantageously parallel to the axis A-A', between the side edges 62, for attaching laterally the side edges 62 against each other, following their edge.

The assembling is carried out edge-to-edge, without superposition between the side edges 62. The thickness of the protective internal layer 40 is maintained constant on a circumference around the axis A-A'.

The manufacturing of the pipe 10 will now be described, with reference to FIGS. 4 to 9.

Initially, the protective internal layer 40 is formed.

Advantageously, a sheet 60 comprising the matrix 50 and the reinforcement elements 52 is provided. The edges 62 of the sheet 60 are then disconnected (see step (a) in FIG. 4).

This sheet 60 was for example made by extrusion and cross-linking of the matrix 50, by embedding the reinforcement elements 52.

The sheet 60 is then wound on itself by folding it in order to bring the edges 62 closer to each other (see step (b) in FIG. 4).

Figure 5:
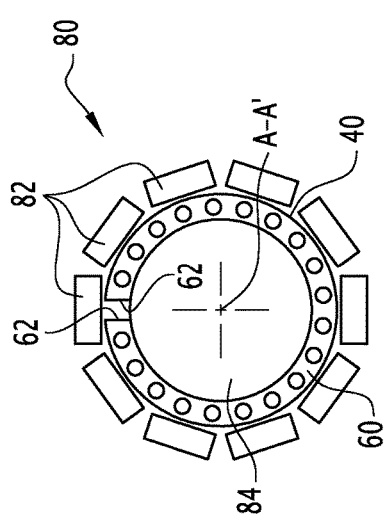
FIG. 5 is a schematic partial sectional view of a step for winding a strip intended to form the interval protective layer of the pipe of FIG. 1.

For this purpose, as illustrated by FIG. 5, the sheet is folded, and then is passed into a conformation device 80 including a plurality of rollers 82 positioned along a circumference around a winding axis A-A'.

The wound sheet 60 is introduced into the central passage 84 defined between the rollers 82 so as to allow the edges 62 to be brought closer and adequately aligned one facing the other.

Advantageously, the number of rollers 82 on a circumference is strictly greater than 4, notably greater than 8, and is for example comprised between 6 and 14.

Next, the assembling assembly 64 is set into place between the edges 62 for attaching the edges 62 to each other and closing the protective internal layer 40 along a generatrix along the axis A-A' (see step (c) in FIG. 4).

Preferably, a protective strip is wound around the wound sheet 60 in order to maintain the tube geometry. The thereby formed protective internal layer 40 is then advantageously wound on a spool with view to its storage and to its transport. The protective internal layer 40 may also be manufactured with a spiral seam in order to avoid differential extension of the longitudinal reinforcements 54 during the winding on a spool.

Next, the layer 40 is wound in order to have it pass through an extrusion die. The first sheath 20 is formed around the protective internal layer 40, for example by extrusion of the polymer making it up (see step (d) in FIG. 4).

Next, the volt 30 is placed around the first sheath 20. The internal armor layers 34, 36 are then set into place around the volt 30.

The external sheath 22 is then formed around the external armor layers 38, 40, advantageously by extrusion of the polymer making it up (see step (d) in FIG. 4).

The end pieces of the pipe 10 are then set up at the ends of the central segment 12. This installation obturates the ring-shaped space 26.

Once the pipe 10 is installed in the extent of water, the abrasive material collected in the bottom assembly 16 circulates through the flexible pipe 10 as far as the surface assembly 15.

By the presence of the protective internal layer 40 positioned in the circulation passage 11 in contact with the abrasive material circulating in the passage 11, the material remains totally away from the pressure sheath 20, which guarantees the seal of the pipe 10 and its lifetime.

As the protective internal layer 40 comprising an elastomeric matrix 50, it locally deforms in contact with the abrasive material. It is therefore relatively not very subject to the cutting or crushing effect caused by the transport of the abrasive material.

Moreover, the presence of the longitudinal reinforcement assembly 52, preferably formed with metal filiform elements 54, ensures very good mechanical strength to the protective layer 40, limiting its wear overtime.

Also, this longitudinal reinforcement 52 gives the possibility of mechanically maintaining the sheet 60 under the effect of its own weight, once it is in a vertical position in the pipe 10.

Figure 11:
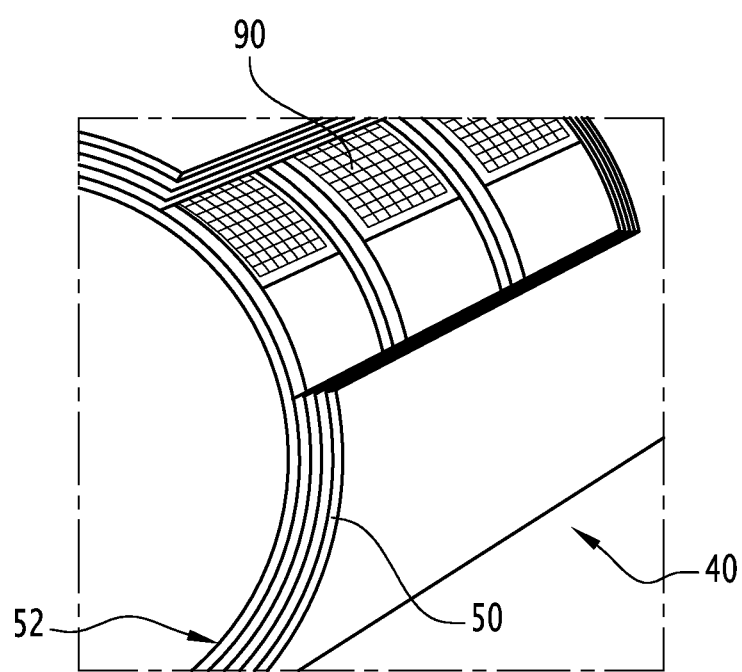
FIG. 11 is a view similar to FIG. 3 of an alternative internal protective layer of the pipe of FIG. 1.

In an alternative, illustrated in FIG. 11, the longitudinal reinforcement assembly 52 includes a network of non-metal reinforcement fibers embedded in the matrix 50. The network is advantageously a technical fabric.

The technical fabric is for example a fabric of aramide or polyethylene fibers with a high molecular weight. The technical fabric forms open worked 90 strips embedded in the matrix 50.

In the example illustrated in FIG. 11, the open worked strips 90 each extend on a circumference around the axis A-A', while being embedded in the matrix 50.

In an alternative (not shown), the protective internal layer 40 is formed by a continuous profile advantageously obtained by extrusion.

Advantageously, the profile is made on the basis of an urethane thermoplastic, an elastomeric thermoplastic, of natural rubber. It has an internal diameter greater than 100 mm and a thickness greater than 10 mm.

In an alternative, the protective internal layer 40 is formed by putting end-to-end several folded sheets 60.

Generally, the flexible pipe 10 according to the invention is able to operate at a low pressure (pressure equal to or less than the ambient pressure) and at high pressure (pressure advantageously less than 200 bars and greater than the ambient pressure).

In all the foregoing, the protective internal layer 40 made from an elastomeric material may be formed either as a pipe of great length, or as a pipe of short length or further as a sheet (or strip).

Making the protective internal layer 40 as a pipe of great length, of the order from 40 m to 50 m, is interesting for applications to underwater pipes of great length for transporting abrasive materials.

Nevertheless, the application, the transport and the installation on the manufacturing site of the pipe according to the invention does not give entire satisfaction.

Indeed, their application requires relatively significant work spaces in order to allow the use of a rigid mandrin of great length for extruding the elastomeric layer as well as the implantation of a vulcanization oven capable of containing such pipes.

Also, because of their imposing lengths, the transport from their manufacturing site as far as the factory for manufacturing the flexible pipes according to the invention may be improved. The winding of these pipes on spools for facilitating their transport and/or the use of trucks including a semi-trailer of great length is not a totally satisfactory solution and generates over costs.

Finally, once they are supplied on the manufacturing site of the flexible pipes according to the invention, the storage of these pipes and/or the installation of the latter at the various tools for manufacturing flexible pipes requires a sufficiently large space, an adaptation of the existing tools and/or the acquisition of new tools. This also has the effect of generating additional costs.

Also, the way of connecting together the different segments of pipes during the manufacturing of the flexible pipes may further be improved.

Making the protective internal layer 40 as a pipe of short length, of the order from 5 m to 15 m is also interesting and has advantages as compared with a pipe of great length.

Indeed, their application is easier since the congestion of the work spaces is reduced.

Further, their transport from their manufacturing site as far as the factory for manufacturing the flexible pipes according to the invention is also easier.

Further, once they are supplied on the manufacturing site of the flexible pipes, the congestion problems related to storage and/or installation are solved. However, the use of suitable tools and/or specific tools and how the different pipe segments are connected together is not always totally satisfactory and generates additional cost in the manufacturing of the flexible pipes.

By making the protective internal layer 40 as a sheet (or strip) gives the possibility of getting rid of all the drawbacks mentioned earlier.

Indeed, their application is easier since it becomes possible to extrude strips of great lengths, comprised between 50 m and several kilometers.

After vulcanization of the strip, the latter may then easily be wound around the barrel of a spool or else cut to the desired length in order to form sheets which will be stacked on a storage pallet. This gives the possibility of both improving the problems related to the congestion of the work space and that of their transport as far as the site for manufacturing flexible pipes according to the invention.

Once they are supplied on the site for manufacturing flexible pipes, the sheets are stored more easily and their installation at the tools required for the manufacturing of said pipes is easier. Thus, the sheets may be wound and then inserted inside a tubular sheath forming the passage for circulation of the abrasive materials at the end of the manufacturing, and then be inserted and assembled at their side edges before said tubular sheath is extruded above.

This last type of making the protective internal sheath is the most advantageous. It gives the possibility of greatly facilitating their application, their transport and their installation on the site for manufacturing the flexible pipes according to the invention. Further, it allows significant reduction in the costs inherent to these actions.

What is claimed is:

1. An unbonded flexible pipe for transporting an abrasive material, comprising:
   at least one tubular sheath delimiting a passage for circulation of the abrasive material;
   at least one armor layer of tensile armors positioned externally with respect to the tubular sheath, the al least one armor layer comprising a plurality of filiform armor elements,
   a protective internal layer positioned inside the at least one tubular sheath in the circulation passage, the protective internal layer including an elastomeric matrix and a longitudinal reinforcement assembly embedded in the matrix;
   wherein the protective internal layer is an innermost layer of the pipe, and wherein the protective internal layer is deformable and locally deforms when the abrasive material makes contact with the protective internal layer.

2. The pipe according to claim 1, wherein the longitudinal reinforcement assembly includes a plurality of filiform metal elements embedded in the matrix.

3. The pipe according to claim 1, wherein the longitudinal reinforcement assembly includes a network of non-metal reinforcement fibers embedded in the matrix.

4. The pipe according to claim 1, wherein the matrix is formed on the basis of an elastomer selected from among a rubber, natural rubber, an artificial rubber of the styrene-butadiene rubber, butadiene rubber, nitrile-butadiene rubber, chloroprene rubber, butyl rubber, ethylene-propylene-diene monomeric rubber type, a polyurethane thermoplastic, or an elastomeric thermoplastic.

5. The pipe according to claim 1, wherein the protective internal layer includes at least one sheet of a continuous material folded on itself along side edges of the al least one sheet and an assembly for assembling the side edges of the at least one sheet.

6. The pipe according to claim 1, wherein the protective internal layer is formed by a continuous profile.

7. The pipe according to claim 1, wherein a thickness of the protective internal layer is greater than 10 mm.

8. The pipe according to claim 1, wherein an internal diameter of the protective internal layer is greater than 10 cm.

9. The pipe according to claim 1, wherein the at least one tubular sheath is attached on the protective internal layer.

10. The pipe according to claim 1, wherein the length of the pipe is greater than 10 m.

11. A method for manufacturing an unbonded flexible pipe for transporting an abrasive material comprising:
    manufacturing at least one tubular sheath;
    positioning at least one tensile armor layer externally with respect to the tubular sheath, the tensile armor layer comprising a plurality of filiform armor elements,
    positioning a protective internal layer inside the at least one tubular sheath in the circulation passage, the protective internal layer including an elastomeric matrix and a longitudinal reinforcement assembly embedded in the matrix, the protective internal layer being positioned as an innermost layer of the pipe.

12. The method according to claim 11, wherein the positioning of the protective internal layer in the at least one tubular sheath is carried out during the manufacturing of the at least one tubular sheath.

13. The method according to claim 11, including a preliminary manufacturing the protective internal layer, the preliminary manufacturing comprising:
    providing a sheet including an elastomeric matrix and a longitudinal reinforcement assembly embedded in the matrix;
    winding the sheet around a winding axis in order to form a tubular protective internal layer.

14. The method according to claim 13, wherein the preliminary manufacturing includes, after winding the sheet, the attachment of side edges of the sheet along a generatrix.

15. A method of using a pipe according to claim 1 comprising transporting an abrasive material between a bottom assembly including a device for picking up and/or collecting a material on the bottom of a body of water and a surface assembly located at the surface of the body of water.

16. The pipe according to claim 3, wherein the network of non-metal reinforcement fibers embedded in the matrix is a technical fabric.

17. The pipe according to claim 5, wherein the side edges are placed end-to-end.

18. The pipe according to claim 5, wherein the assembly for assembling the side edges of the sheet is an adhesive bonding, stapling, snap-on fastening, crimping, and/or wrapping assembly.

19. The method according to claim 12, wherein the positioning of the protective internal layer in the at least one tubular sheath is carried out by extrusion of the at least one tubular sheath above the protective internal layer.

\* \* \* \* \*